(12) United States Patent
Yamaoka

(10) Patent No.: US 9,533,902 B2
(45) Date of Patent: Jan. 3, 2017

(54) SALT WATER SUPPLY UNIT AND WATER SOFTENING APPARATUS

(71) Applicant: Miura Co., Ltd., Ehime (JP)

(72) Inventor: Shinya Yamaoka, Ehime (JP)

(73) Assignee: MIURA CO., LTD., Matsuyama-Shi, Ehime (JP)

( * ) Notice: Subject to any disclaimer, the term of this patent is extended or adjusted under 35 U.S.C. 154(b) by 21 days.

(21) Appl. No.: 14/421,331

(22) PCT Filed: Aug. 7, 2013

(86) PCT No.: PCT/JP2013/071342
§ 371 (c)(1),
(2) Date: Feb. 12, 2015

(87) PCT Pub. No.: WO2015/019440
PCT Pub. Date: Feb. 12, 2015

(65) Prior Publication Data
US 2015/0218026 A1    Aug. 6, 2015

(51) Int. Cl.
*C02F 5/00* (2006.01)
*C02F 1/42* (2006.01)
(Continued)

(52) U.S. Cl.
CPC ............... *C02F 5/00* (2013.01); *B01J 49/00* (2013.01); *C02F 1/42* (2013.01); *C02F 2001/425* (2013.01);
(Continued)

(58) Field of Classification Search
CPC ........... B01J 49/00; G01F 23/30; G01F 23/56; G01F 23/58
See application file for complete search history.

(56) References Cited

U.S. PATENT DOCUMENTS 3,963,041 A * 6/1976 McGillis ............... F16K 21/18
137/404
4,336,134 A * 6/1982 Prior ................... B01J 49/0086
137/513.5
(Continued)

FOREIGN PATENT DOCUMENTS

JP    H 04-108586      4/1992
JP    H 04-081639 U    7/1992
(Continued)

OTHER PUBLICATIONS

JP 2009-168639 machine translation, Jul. 30, 2009.*

*Primary Examiner* — Krishnan S Menon
*Assistant Examiner* — Bradley R Spies
(74) *Attorney, Agent, or Firm* — Muncy, Geissler, Olds & Lowe, P.C.

(57) ABSTRACT

A salt water supply unit includes a salt water plate that divides the interior of a salt water tank into a salt container and a salt water reservoir, and a salt water well that stands and penetrates the salt water plate. The salt water well accommodates a salt water valve device and a concentration detector. The salt water valve device includes a valve box having a valve hole that allows makeup water or salt water to flow therethrough, a float rod penetrating the valve hole, a valve element coupled to a first end of the float rod, and a water level detecting float coupled to a second end of the float rod. The concentration detector includes a switch that is incorporated in a stem holding a concentration detecting float. The switch outputs different detection signals in accordance with the position of the concentration detecting float.

3 Claims, 10 Drawing Sheets

(51) Int. Cl.
*B01J 41/00* (2006.01)
*B01J 49/00* (2006.01)

(52) U.S. Cl.
CPC ........ *C02F 2209/42* (2013.01); *C02F 2303/16* (2013.01); *C02F 2303/22* (2013.01)

(56) References Cited

U.S. PATENT DOCUMENTS

2002/0017495 A1 2/2002 Iizuka et al.
2007/0227976 A1 10/2007 Furukawa et al.

FOREIGN PATENT DOCUMENTS

| | | | | |
|---|---|---|---|---|
| JP | 2002-35743 | A | 2/2002 | |
| JP | 2007-260574 | | 10/2007 | |
| JP | 2009168639 | A * | 7/2009 | ............... G01N 9/12 |
| JP | 2010-5494 | A | 1/2010 | |
| JP | 2010-29778 | A | 2/2010 | |
| JP | 2011-31214 | A | 2/2011 | |

* cited by examiner

SALT WATER SUPPLY UNIT AND WATER SOFTENING APPARATUS

TECHNICAL FIELD

The present invention relates to a salt water supply unit and a water softening apparatus including the same.

BACKGROUND ART

A water softening apparatus removes hardness components in raw water such as tap water using an ion exchange resin bed (water softening treatment) to obtain soft water. Hardness component removing ability of the ion exchange resin bed is gradually decreased by continuous water softening treatment. Regenerating treatment of recovering the hardness component removing ability thus needs to be executed before the hardness component removing ability is lost, by causing the ion exchange resin bed to react with salt water (e.g. sodium chloride aqueous solution).

Recently provided is a water softening apparatus that automatically switches passages between raw water softening treatment and ion exchange resin bed regenerating treatment. This water softening apparatus includes a pressure tank (resin cylinder) accommodating an ion exchange resin bed configured to soften raw water, a control valve configured to automatically switch fluid passages upon switching between water softening treatment and regenerating treatment, and a salt water supply unit (salt water supply device) configured to supply the pressure tank with salt water used for regeneration of the ion exchange resin bed (see Patent Document 1).

The salt water supply unit includes, as main elements, a salt water tank, a salt water plate, a water level detecting float, a salt water well, and a salt water valve. The salt water tank accommodates a salt container configured to contain salt serving as a regenerant, and a salt water reservoir configured to reserve salt water that is generated from salt and makeup water (e.g. raw water) supplied from outside. The salt water plate is a water permeable member that partitions the interior of the salt water tank into the salt container and the salt water reservoir and allows salt to be placed on its upper surface. The water level detecting float is a member that is located inside the salt water well and is floatable on a water surface.

The salt water well is a cylindrical member that stands in the salt water tank so as to be divided from the salt container and to surround the water level detecting float. The salt water well has a communication hole (flow hole) allowing fluid to flow between the interior of the salt water well and the salt water reservoir. The communication hole of the salt water well prescribes, by its height, the maximum amount of salt water fed from the salt water reservoir into the salt water well, in other words, the maximum amount of salt water consumed by regenerating treatment.

The salt water valve is located in the salt water well and has a communication passage connecting the communication hole of the salt water well and the exterior of the salt water tank, a valve element configured to open or close the communication passage in accordance with the position of the water level detecting float, and the like. The salt water well vertically penetrates the salt water plate and is inserted to the bottom of the salt water tank (see Patent Documents 2 and 3).

The control valve switches the passages upon regenerating treatment in the water softening apparatus, so that salt water is imported from the salt water tank into the pressure tank and the ion exchange resin bed is regenerated. The salt water tank is supplied with makeup water after regenerating treatment, so as to generate salt water to be used for next regenerating treatment. Salt in the salt container dissolves in this makeup water, so that salt water of the saturated concentration is generated in the salt water tank.

Patent Document 1: Japanese Patent Laid-open Publication No. 2007-260574
Patent Document 2: Japanese Patent Laid-open Publication No. 04-108586
Patent Document 3: Japanese Patent Laid-open Publication No. 2011-31214

DISCLOSURE OF THE INVENTION

Problems to be Solved by the Invention

Makeup water (fresh water) is supplied from the interior of the salt water well toward the salt water tank in the salt water supply unit. When salt dissolves, salt water outside the salt water well is different in concentration from salt water inside the salt water well. More specifically, makeup water in the salt water tank comes into contact with salt and is likely to be salt water of a high concentration, whereas makeup water in the salt water well does not come into contact with salt and is likely to be salt water of a low concentration. This difference in concentration is gradually decreased by diffusion of salt in water due to a concentration gradient. However, quite a long period (e.g. several tens of hours) is necessary until salt water inside the salt water well and salt water outside the salt water well are uniformized in concentration.

When there is such a difference in concentration (difference in specific gravity) between salt water inside the salt water well and salt water outside the salt water well, the water level of salt water in the salt water tank is relatively low whereas the water level of salt water in the salt water well is relatively high. Salt water to be used for regenerating treatment is extracted from the bottom area of the salt water tank. The difference in water level once caused is not easily eliminated. When makeup water is supplied from the interior of the salt water well toward the salt water tank in such a state, the water level detecting float located in the salt water well reaches a prescribed water level before the water level of the salt water tank ascends to the prescribed water level. Inflow of makeup water is blocked when the water level detecting float reaches the prescribed water level. The water level of the salt water tank is thus lower than a preset water level. Accordingly, makeup water may not come into contact with salt placed on the salt water plate and salt water of the saturated concentration may not be generated appropriately.

In a salt water supply unit including a salt water well that accommodates a salt concentration sensor, accurate detection of a concentration of salt water in a salt water tank is difficult when there is a difference in concentration between salt water inside the salt water well and salt water outside the salt water well. The salt concentration sensor is a device configured to detect whether or not salt water of a prescribed concentration (e.g. the saturated concentration) is generated in the salt water tank. When the salt concentration sensor detects that salt water of the prescribed concentration is not generated, the water softening apparatus reports shortage of residual salt to a user. If a concentration of salt water generated in the salt water tank is not detected accurately, the water softening apparatus may fail to report shortage of residual salt to a user at appropriate timing.

In view of the above, an object of the present invention is to provide a salt water supply unit configured to quickly uniformize a concentration of salt water reserved in a salt water well and a concentration of salt water reserved in a salt water tank when the salt water tank is supplied with makeup water.

Means for Solving the Problems

The present invention relates to a salt water supply unit including: a salt water tank having a salt container configured to contain salt and a salt water reservoir configured to reserve salt water that is generated from the salt contained in the salt container and makeup water imported from outside; a salt water plate provided in the salt water tank and allowing the salt contained in the salt container to be placed thereon; a salt water valve device having functions of controlling a flow of makeup water from outside and a flow of salt water to outside and blocking the flow of makeup water when a water level of the salt water tank reaches a prescribed water level preliminarily set; at least one concentration detector having a concentration detecting float configured to float or sink in accordance with a concentration of salt water in the salt water tank and to output a detection signal in accordance with a position of the concentration detecting float; and a salt water well provided in the salt water tank and accommodating the salt water valve device and the concentration detector; wherein the salt water well has an upper communication port connected to the salt water reservoir in a side surface at a position between a water surface at the prescribed water level and an upper surface of the salt water plate, and has a lower communication port connected to the salt water reservoir in the side surface at a position between a lower surface of the salt water plate and a bottom surface of the salt water tank, the salt water valve device includes a valve box having a valve hole that allows makeup water or salt water to flow therethrough, a float rod having a bar shape and penetrating the valve hole, a valve element coupled to a first end of the float rod and configured to open and close the valve hole, and a water level detecting float coupled to a second end of the float rod, the concentration detector includes a float position detecting switch incorporated in a stem holding the concentration detecting float so as to be shiftable upward and downward, the float position detecting switch outputs a first detection signal when salt water has a concentration not less than a preset concentration and the concentration detecting float reaches a preset position, and outputs a second detection signal different from the first detection signal when salt water has a concentration less than the preset concentration and the concentration detecting float is distant from the preset position, and the stem is located close to the float rod that is positioned between the valve box and the water level detecting float.

The stem is preferably located such that an axial center of the stem is positioned on a single circumference around an axial center of the float rod.

Preferably, the water level detecting float shifted to the prescribed water level as the maximum rising position is set such that a lower end of the water level detecting float is positioned in a range from the upper surface of the salt water plate to a position thereabove by 20 to 100 mm, and the concentration detecting float is set such that a lower end of the concentration detecting float is positioned in a range from the lower end of the water level detecting float shifted to a maximum rising position to a position therebelow by 150 mm.

Preferably, the water level detecting float has a cylindrical shape and a vertical section in an upward concave shape, and the water level detecting float has guide members above and below the water level detecting float in an axial direction of the float rod, and the guide member located below the water level detecting float has a baffle plate suppressing bubbles from entering the water level detecting float.

The present invention also relates to a water softening apparatus including: a pressure tank filled with an ion exchange resin bed; a passage switching valve unit connected to the pressure tank and configured to switch internal passages; the salt water supply unit being connected to the passage switching valve unit and configured to supply the pressure tank with salt water serving as a regenerant through the passage switching valve unit when the passage switching valve unit switches the passages to allow a process of regenerating the ion exchange resin bed to be executed; and a controller configured to switch the passages at the passage switching valve unit and determine a concentration of salt water in the salt water supply unit; wherein the controller determines the concentration of the salt water in the salt water supply unit immediately before the regenerating process and reports shortage of residual salt when the controller determines that the concentration of the salt water in the salt water supply unit is less than a preset concentration.

Effects of the Invention

The present invention can provide a salt water supply unit configured to quickly uniformize a concentration of salt water reserved in a salt water well and a concentration of salt water reserved in a salt water tank when the salt water tank is supplied with makeup water.

PREFERRED MODE FOR CARRYING OUT THE INVENTION

A salt water supply unit and a water softening apparatus including the same according to each embodiment of the present invention will now be described below.

First Embodiment

Figure 1:
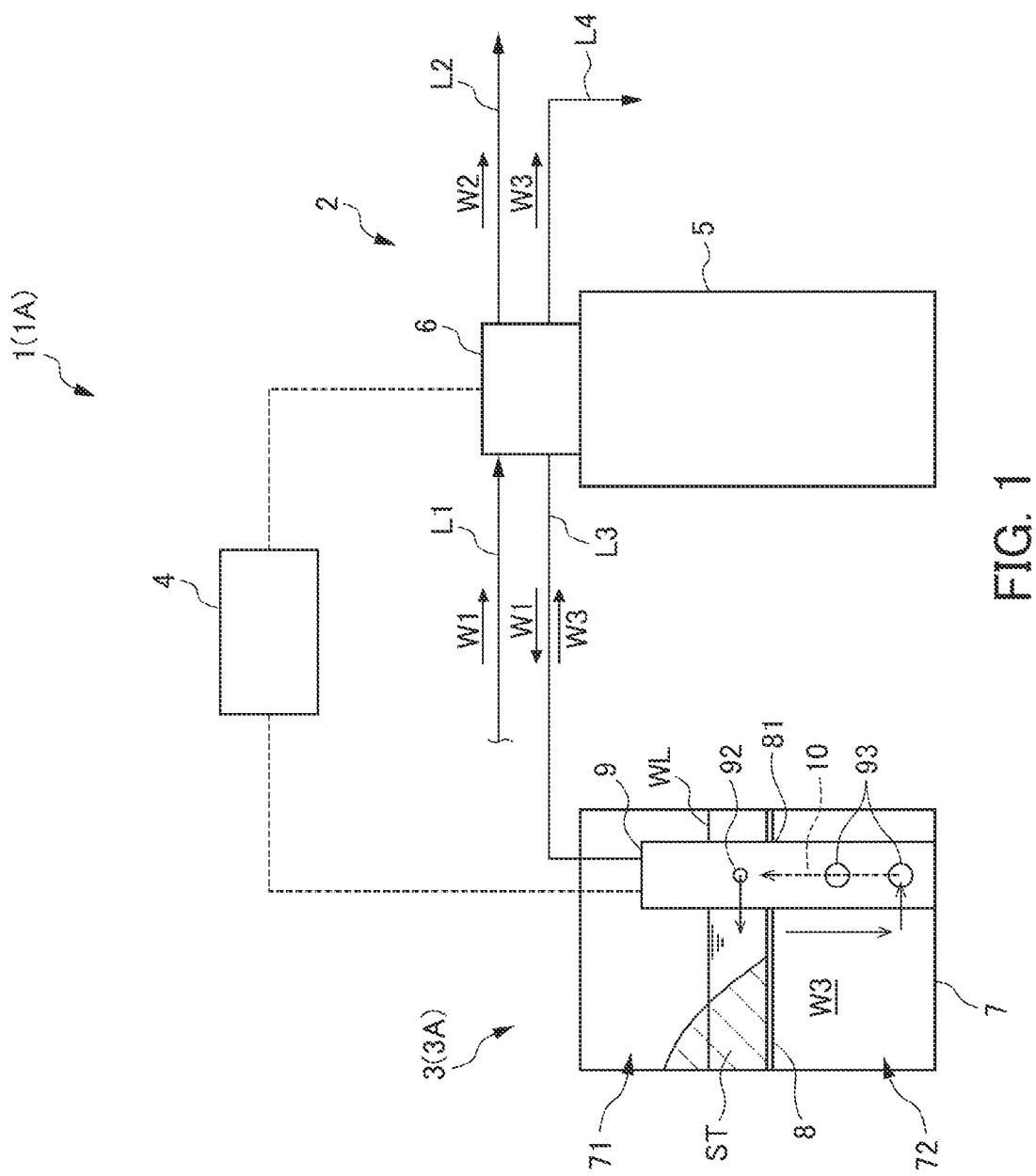
FIG. 1 is a schematic configuration diagram of a water softening apparatus 1 according to a first embodiment.

FIG. 1 is a schematic configuration diagram of a water softening apparatus 1 according to the first embodiment. As shown in FIG. 1, the water softening apparatus 1 according to the first embodiment includes an ion exchange unit 2, a salt water supply unit 3, and a controller 4. The water softening apparatus 1 also includes a raw water line L1, a soft water line L2, a salt water-makeup water line L3, and a drainage water line L4. FIG. 1 indicates an electrical path (signal line) by a broken line.

The ion exchange unit 2 softens hardness components in imported raw water W1 using an ion exchange resin bed to obtain soft water W2. The ion exchange unit 2 includes a pressure tank 5 and a passage switching valve unit 6.

The pressure tank 5 is a container filled with the ion exchange resin bed (not shown) configured to remove hardness components in raw water W1. The ion exchange resin bed is made of strong acid cation exchange resin beads or the like.

The passage switching valve unit 6 has a plurality of valves and a plurality of passages (not shown). Each of the valves is linked to a motor by way of a cam (neither shown). When the cam is rotated to a predetermined angle by drive power of the motor and a shaft joined to a valve element is shifted forward or backward, a predetermined one of the valves is opened or closed to switch the passages. The motor is electrically connected to the controller 4 by way of the signal line. A command signal transmitted from the controller 4 to the motor controls open and close of the valve.

The passage switching valve unit 6 is connected to the top of the pressure tank 5 and seals an upper opening (not shown) of the pressure tank 5. The passage switching valve unit 6 is provided, in the bottom at positions corresponding to the upper opening of the pressure tank 5, with open ends of a water flow channel, a water drainage channel, and the like (not shown). Operation processes such as a water flowing process and a regenerating process to be executed by switching the passages of the passage switching valve unit 6 will be described later.

The salt water supply unit 3 supplies the pressure tank 5 with salt water in the regenerating process. The salt water supply unit 3 includes a salt water tank 7, a salt water plate 8, a salt water well 9, and a salt water valve device 10 (merely indicated by a reference sign).

The salt water tank 7 is a drum-shaped container configured to reserve salt water W3. The salt water tank 7 accommodates the salt water plate 8 that is located horizontally. The salt water plate 8 divides the interior of the salt water tank 7 into a salt container 71 and a salt water reservoir 72. The salt container 71 is a region for containing salt ST that serves as a regenerant. The salt water reservoir 72 is a region for reserving salt water W3 that is generated from salt ST contained in the salt container 71 and makeup water (raw water W1) imported from outside.

The salt water valve device 10 (to be described later) adjusts the amount of makeup water (raw water W1) to be supplied into the salt water tank 7. Generation of salt water W3 requires constant contact between makeup water and salt ST. Makeup water is thus supplied to reach a prescribed water level WL that is set above the salt water plate 8. When salt ST dissolves in makeup water, the water surface of generated salt water W3 ascends slightly from the prescribed water level WL.

The salt water plate 8 is a disk-shaped member that allows salt ST contained in the salt container 71 to be placed thereon. The salt water plate 8 is a water permeable plate member (e.g. a porous plate or a mesh plate). The upper surface of the salt water plate 8 is covered with a fine mesh net in order to prevent drop of crystal grains of salt ST. Part of salt ST placed on the salt water plate 8 dissolves to be mixed with makeup water and shifts from the salt water plate 8 into the salt water reservoir 72, so that salt water W3 is obtained. The salt water plate 8 has a circular hole 81. The salt water well 9 (to be described later) penetrates the circular hole 81 and is located on the bottom surface of the salt water tank 7.

When the salt water tank 7 is supplied with makeup water and a concentration of salt water reserved in the salt water tank 7 becomes lower than the saturated concentration (about 26 wt %), salt ST placed on the salt water plate 8 dissolves in salt water W3 reserved in the salt water reservoir 72. The concentration of salt water is gradually increased by dissolution of salt ST, and dissolution of salt ST stops when the concentration approximates the saturated concentration. Salt water W3 reserved in the salt water tank 7 is thus kept at a concentration approximate to the saturated concentration. Residual salt ST is kept on the salt water plate 8.

The salt water well 9 is a container that accommodates the salt water valve device 10 and a concentration detector 11 (not shown) so as to be isolated from salt ST. The salt water valve device 10 has functions of controlling a flow of makeup water (raw water W1) from the passage switching valve unit 6 and a flow of salt water W3 to the passage switching valve unit 6 and blocking the flow of makeup water when the water level of the salt water tank reaches the prescribed water level WL preliminarily set. The concentration detector 11 has a function of detecting a concentration of salt water in the salt water well 9. The configurations of the salt water well 9, the salt water valve device 10, and the concentration detector 11 will be described later.

The controller 4 is a microprocessor (not shown) including a CPU and a memory. The controller 4 is electrically connected to the passage switching valve unit 6 and the salt water valve device 10. The controller 4 transmits a command signal to the passage switching valve unit 6 in accordance with an operation process. The controller 4 also receives a detection signal transmitted from the salt water valve device 10.

The controller 4 switches the passages in the passage switching valve unit 6 in accordance with preliminarily programmed operation processes. The controller 4 transmits a command signal according to a predetermined operation process to the passage switching valve unit 6. In the passage switching valve unit 6, the command signal transmitted from the controller 4 causes the incorporated motor (not shown) to be driven, and a predetermined one of the valves is opened or closed by means of the cam. When the predetermined valve is opened or closed, an appropriate one of the passages for the operation process is set in the passage switching valve unit 6.

The controller 4 determines a concentration of salt water W3 immediately before the regenerating process, in accordance with a detection signal transmitted from the concentration detector 11 (to be described later) of the salt water valve device 10. If the controller 4 determines that the concentration of salt water reserved in the salt water tank 7 is less than the prescribed concentration preliminarily set (e.g. 13 wt %), shortage of residual salt is reported to a user. In the present embodiment, shortage of residual salt is reported to a user by lighting (or blinking) an alarm lamp that is provided at an operation panel (not shown) of the water softening apparatus 1. Process steps for determination of a concentration of salt water W3 by the controller 4 will be described later.

The raw water line L1 allows raw water W1 such as tap water to flow therethrough. The raw water line L1 has an upstream end connected to a supply source (not shown) of raw water W1. The raw water line L1 has a downstream end connected to a raw water inlet of the passage switching valve unit 6.

The soft water line L2 allows soft water W2 obtained at the ion exchange unit 2 to flow therethrough. The soft water line L2 has an upstream end connected to a soft water outlet of the passage switching valve unit 6. The soft water line L2 has a downstream end connected to a demand point of soft water W2.

The salt water-makeup water line L3 connects the salt water valve device 10 and the passage switching valve unit 6. Salt water W3 flows through the salt water-makeup water line L3 from the salt water well 9 toward the passage switching valve unit 6 in the operation process of regenerating treatment (hereinafter, also referred to as the "regenerating process"). Makeup water (raw water W1) also flows through the salt water-makeup water line L3 from the passage switching valve unit 6 toward the salt water well 9 in the operation process of supplying the salt water tank 7 with makeup water (hereinafter, also referred to as a "water refilling process").

The drainage water line L4 is used for draining salt water W3 having been used in the regenerating process. The drainage water line L4 has an upstream end connected to a salt water outlet of the passage switching valve unit 6. The drainage water line L4 has a downstream end opened toward a drainage port (not shown) of salt water W3.

Respective operation processes executed by the water softening apparatus 1 will be described next. The water softening apparatus 1 according to the present embodiment executes the water flowing process, the regenerating process, and the water refilling process in the mentioned order, as main operation processes. Other processes (e.g. a displacement process) will not be described herein.

Soft water W2 is obtained from raw water W1 in the water flowing process. Raw water W1 is supplied to the pressure tank 5 through the raw water line L1 and the passage switching valve unit 6 in the water flowing process. In the pressure tank 5, hardness components are removed while raw water W1 passes through the ion exchange resin bed and soft water W2 is thus obtained. Soft water W2 obtained at the pressure tank 5 is sent from the passage switching valve unit 6 to the demand point through the soft water line L2.

Hardness component removing ability of the ion exchange resin bed is recovered in the regenerating process. Salt water W3 reserved in the salt water tank 7 is imported to the pressure tank 5 through the salt water-makeup water line L3 and the passage switching valve unit 6 in the regenerating process. Salt water W3 imported to the pressure tank 5 regenerates the ion exchange resin bed. Salt water W3 having regenerated the ion exchange resin bed is drained to outside through the drainage water line L4.

In the water refilling process, the salt water tank 7 is supplied with an amount of makeup water enough for repreparation of an equivalent amount of salt water W3 consumed in the regenerating process. In the water refilling process, raw water W1 serving as makeup water is supplied to the salt water tank 7 through the raw water line L1, the passage switching valve unit 6, and the salt water-makeup water line L3. Makeup water supplied to the salt water tank 7 in the water refilling process is not limited to raw water W1 and can be soft water W2.

The configurations of the salt water well 9, the salt water valve device 10, and the concentration detector 11 will be described next.

The salt water well 9 will be described initially.

Figure 2:
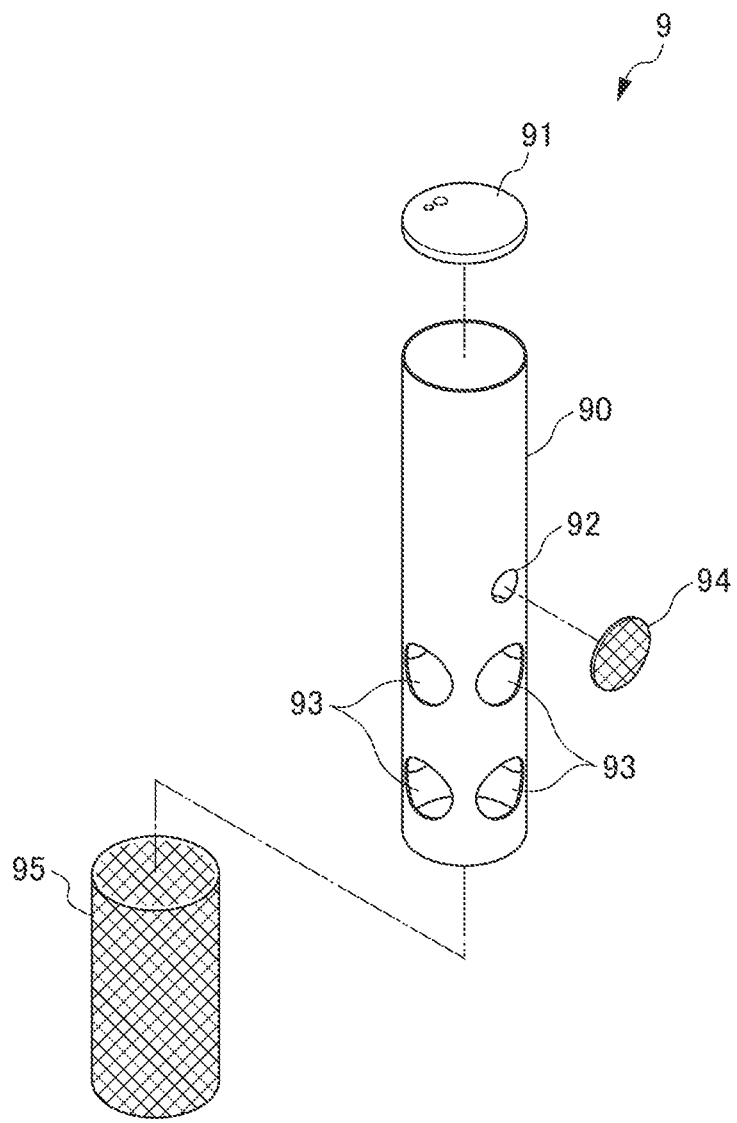
FIG. 2 is a perspective view showing the configuration of a salt water well 9.

FIG. 2 is a perspective view showing the configuration of the salt water well 9. As shown in FIG. 2, the salt water well 9 includes a cylindrical main body 90 and a cover 91. The salt water well 9 is further provided, in the side surface of the main body 90, with an upper communication port 92 and lower communication ports 93.

The upper communication port 92 is an opening connecting the salt water well 9 and the salt water reservoir 72 at an upper portion of the salt water well 9. As shown in FIG. 1, the upper communication port 92 is located in the side surface of the salt water well 9, at a position between the water surface at the prescribed water level WL and the upper surface of the salt water plate 8. As shown in FIG. 2, the single upper communication port 92 is provided in the side surface of the salt water well 9. As shown in FIG. 2, a filter 94 (not shown in FIG. 1) is attached to the upper communication port 92. The filter 94 attached to the upper communication port 92 can prevent salt ST from entering the salt water well 9. Although not shown in the figures, the upper communication port 92 is preferably directed along a tangential line of an inner circumferential circle of the salt water tank 7. The filter 94 thus disposed hardly receives weight of salt ST. Accordingly, the filter 94 is not damaged and a flow of salt water W3 through the filter 94 is not inhibited.

Each of the lower communication ports 93 is an opening connecting the salt water well 9 and the salt water reservoir 72 at a lower portion of the salt water well 9. As shown in FIG. 1, the lower communication ports 93 are located in the side surface of the salt water well 9, at positions between the lower surface of the salt water plate 8 and a bottom surface 73 of the salt water tank 7. As shown in FIG. 2, the eight lower communication ports 93 are provided in the side surface of the salt water well 9. As shown in FIG. 2, a cylindrical filter 95 (not shown in FIG. 1) is attached to the lower communication ports 93. The filter 95 attached to the lower communication ports 93 prevents dirt and the like from entering the salt water well 9.

The cover 91 has two holes (not denoted by reference signs) which allow a salt water valve pipe 110 and a sensor cable protective tube 119 (to be described later) to penetrate.

Functions of the upper communication port 92 and the lower communication ports 93 provided at the salt water well 9 will now be described with reference to FIG. 1.

At the start of the water refilling process (in other words, at the end of the regenerating process), a small amount of salt water W3 remains at the bottom of the salt water tank 7. When makeup water (raw water W1) is supplied from outside to reach the prescribed water level WL, the remaining salt water W3 is diluted. The concentration of entire salt water in the salt water reservoir 72 is thus decreased at the end of the water refilling process. When salt ST dissolves and shifts from the salt water plate 8 into the salt water reservoir 72 in this state, the concentration of salt water in an upper region of the salt water reservoir 72 becomes relatively higher than the concentration of salt water in a lower region of the salt water reservoir 72. More specifically, salt water W3 of high specific gravity stays in the upper region of the salt water reservoir 72 whereas salt water W3 of low specific gravity stays in the lower region of the salt water reservoir 72. Salt water W3 of high specific gravity is then likely to push down salt water W3 of low specific gravity. A downward flow (indicated by a downward solid arrow in the figure) of salt water W3 is thus generated in the salt water reservoir 72. Salt water W3 of low specific gravity pushed out of the lower region of the salt water reservoir 72 by the downward flow flows into the salt water well 9 through the lower communication ports 93. Salt water W3 having flowed into the salt water well 9 pushes up salt water W3 in the salt water well 9 from a lower region toward an upper region. An upward flow (indicated by an upward broken arrow in the figure) of salt water W3 is thus generated in the salt water well 9. Salt water W3 of low specific gravity pushed out of the upper region of the salt water well 9 by the upward flow flows out of the salt water well 9 through the upper communication port 92. Salt water W3 of low specific gravity repeatedly comes into contact with salt ST to promote dissolution of salt.

In this manner, when makeup water is supplied from outside to the salt water tank 7 in the water refilling process, a difference in specific gravity of salt water W3 generates a downward flow of salt water W3 outside the salt water well 9 (in the salt water reservoir 72) and an upward flow of salt water W3 inside the salt water well 9. That is, circulating convection of salt water W3 is generated between the interior of the salt water well 9 and the salt water tank 7. This circulating convection lasts until the difference in specific gravity, in other words, the difference in concentration between the interior and the exterior of the salt water well 9 is eliminated substantially. Salt water W3 reserved in the salt water well 9 and salt water W3 reserved in the salt water tank 7 are thus quickly uniformized in concentration.

The salt water valve device 10 will be described next.

Figure 3:
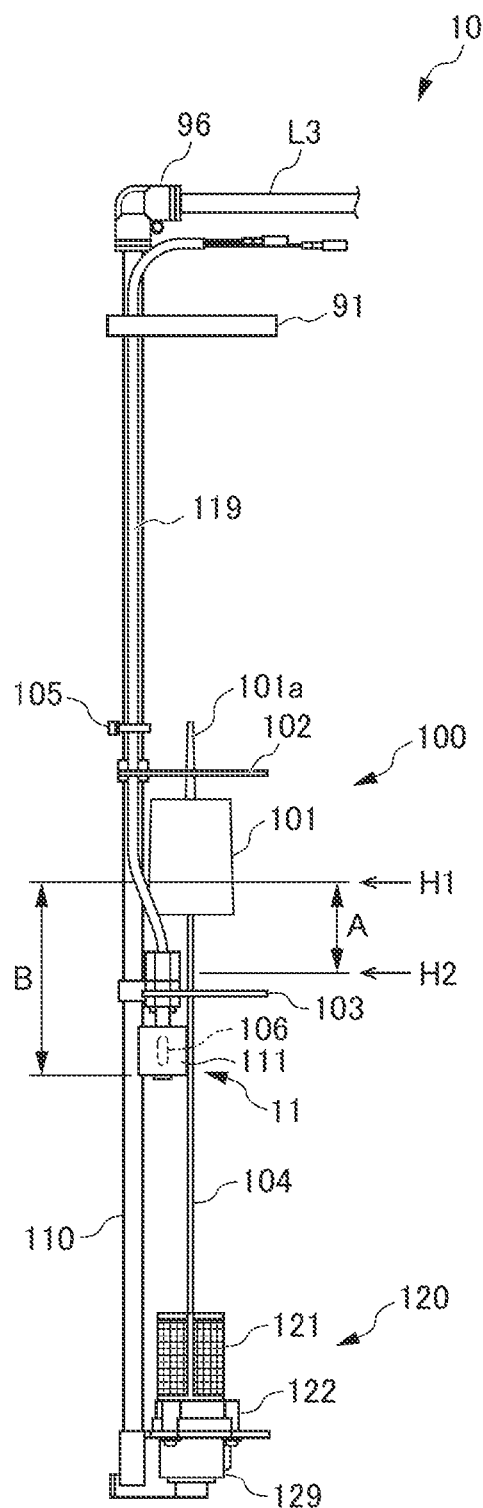
FIG. 3 is a side view of a salt water valve device 10 including a concentration detector 11.
Figure 4:
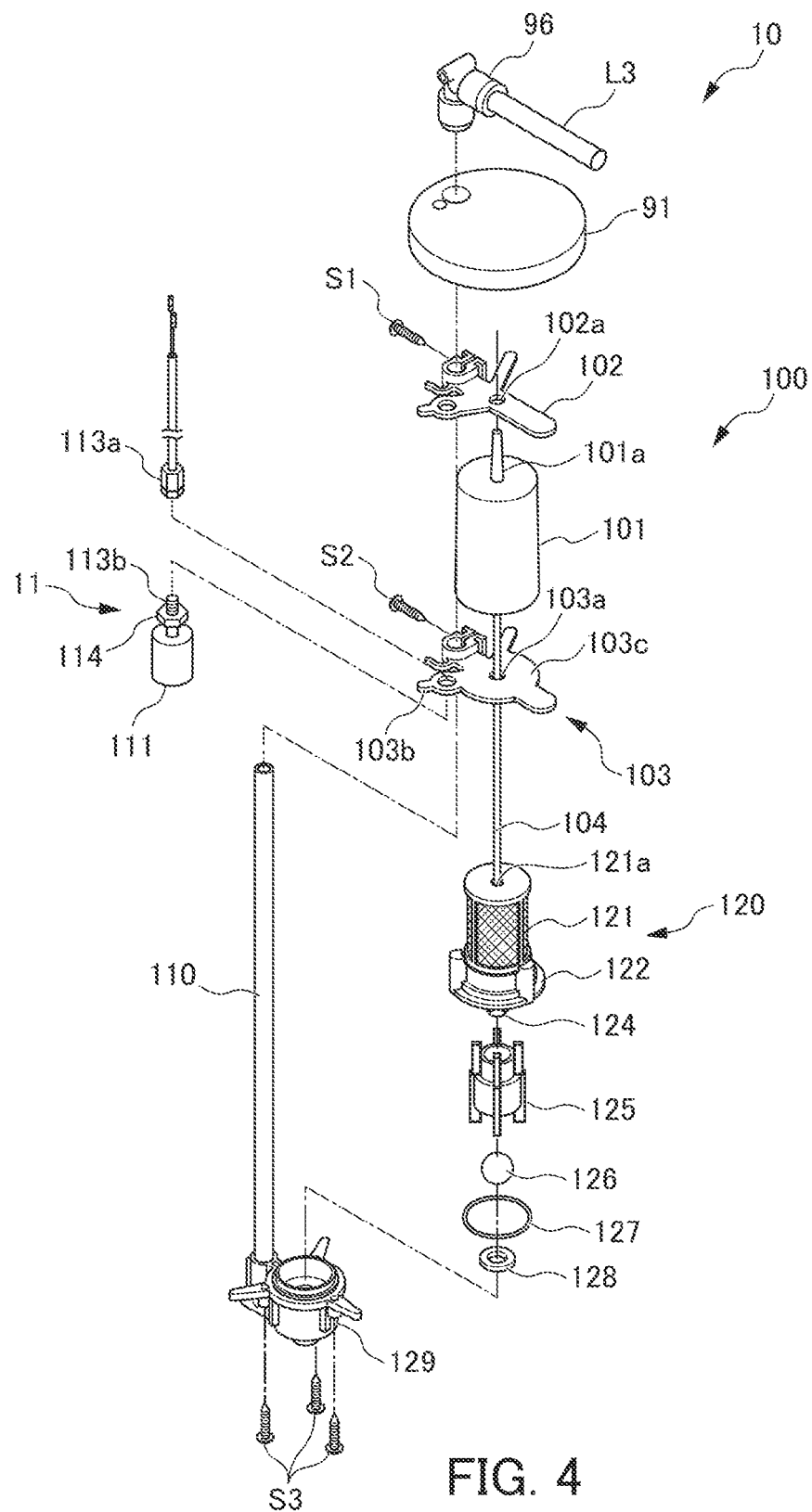
FIG. 4 is an exploded perspective view of the salt water valve device 10 including the concentration detector 11.
Figure 5:
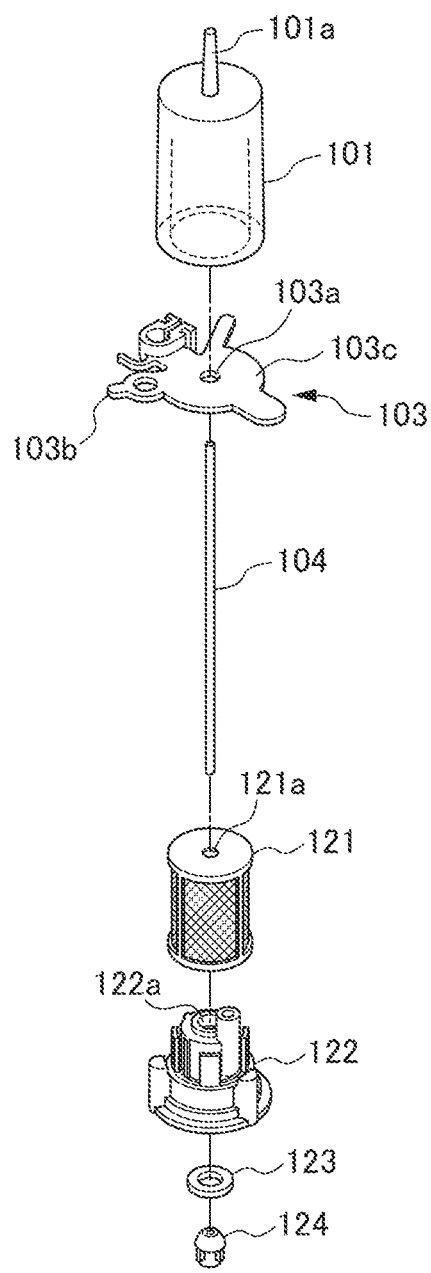
FIG. 5 is an exploded perspective view of a principal part of the salt water valve device 10.
Figure 6:
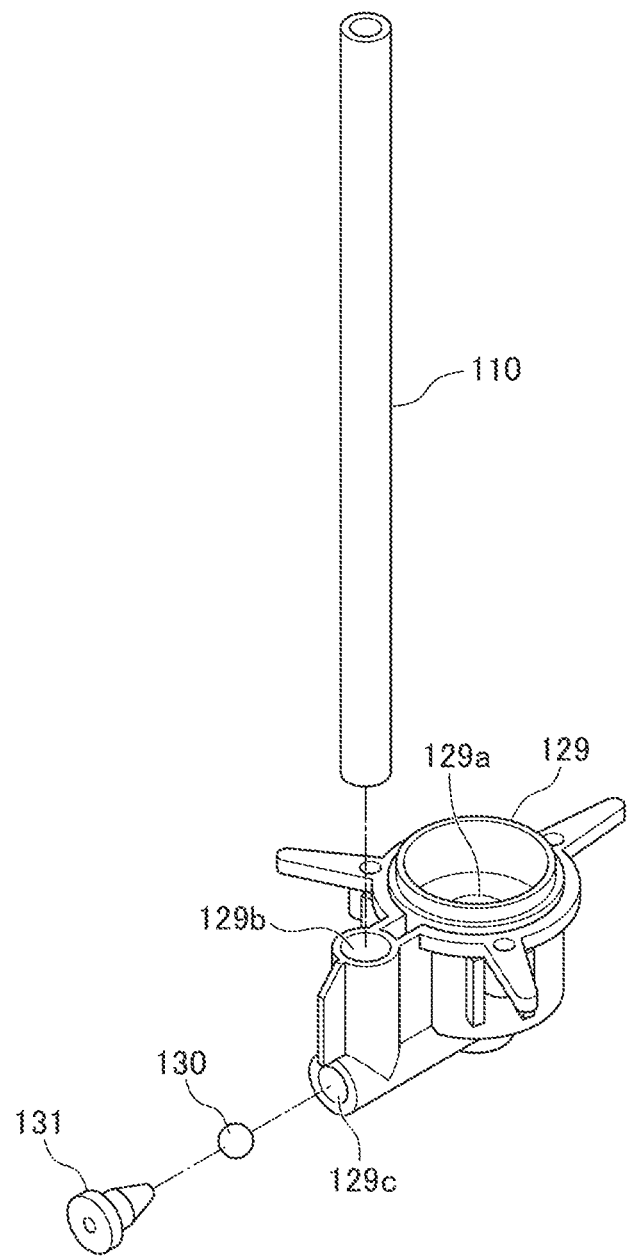
FIG. 6 is an exploded perspective view showing the configuration around an upper air check housing 122 in the salt water valve device 10.
Figure 7:
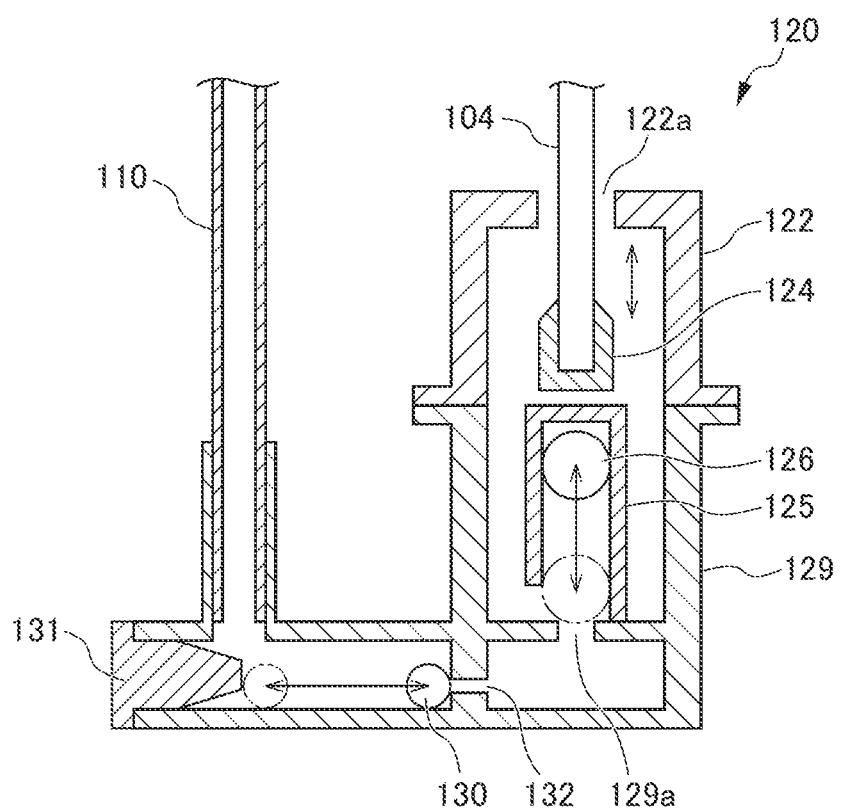
FIG. 7 is a schematic sectional view showing the internal structure of an air check housing portion 120.

FIG. 3 is a side view of the salt water valve device 10 including the concentration detector 11. FIG. 4 is an exploded perspective view of the salt water valve device 10 including the concentration detector 11. FIG. 5 is an exploded perspective view of a principal part of the salt water valve device 10. FIG. 6 is an exploded perspective view showing the configuration around an upper air check housing 122 in the salt water valve device 10. FIG. 7 is a schematic sectional view showing the internal structure of an air check housing portion 120.

As shown in FIGS. 3 and 4, the salt water valve device 10 includes a float portion 100, the salt water valve pipe 110, and the air check housing portion 120. The concentration detector 11 (to be described later) is attached to the salt water valve device 10.

The float portion 100 includes a water level detecting float 101, an upper guide member 102, a lower guide member 103, and a float rod 104.

The water level detecting float 101 is a member configured to detect a water level of salt water W3 reserved in the salt water well 9. As shown in FIG. 5, the water level detecting float 101 has a cylindrical shape and a vertical section in an upward concave shape. The water level detecting float 101 is provided at the top with a guide shaft 101a. The water level detecting float 101 is made of a material of specific gravity lower than that of makeup water (raw water W1). The water level detecting float 101 is thus buoyant on makeup water and salt water W3.

Positioning of the water level detecting float 101 will be described below. Reference sign H1 in FIG. 3 indicates the position of the lower end of the water level detecting float 101 when the water level detecting float 101 is shifted to the prescribed water level WL at the maximum rising position. Reference sign H2 in FIG. 3 indicates the position of the upper surface of the salt water plate 8 (see FIG. 1). The water level detecting float 101 is located such that, when the water level detecting float 101 is shifted to the prescribed water level WL at the maximum rising position, the lower end (H1) is positioned in a range (A in the figure) from the upper surface (H2) of the salt water plate 8 to the position thereabove by 20 to 100 mm. Positioning of a concentration detecting float 111 provided adjacent to the water level detecting float 101 will be described later.

The float portion 100 will be described again.

The upper guide member 102 and the lower guide member 103 regulate a shift range of the water level detecting float 101 in the vertical direction (the axial direction of the float rod 104).

As shown in FIG. 4, the upper guide member 102 is located above the water level detecting float 101 in the axial direction of the float rod 104. The upper guide member 102 is attached to the salt water valve pipe 110 by a screw S1. The upper guide member 102 has a guide hole 102a. The guide shaft 101a of the water level detecting float 101 penetrates the guide hole 102a.

As shown in FIG. 4, the lower guide member 103 is located below the water level detecting float 101 in the axial direction of the float rod 104. The lower guide member 103 is attached to the salt water valve pipe 110 by a screw S2. The lower guide member 103 has a guide hole 103a. The float rod 104 (to be described later) penetrates the guide hole 103a. As shown in FIGS. 3 and 4, the lower guide member 103 has a sensor attachment piece 103b. The concentration detector 11 (to be described later) is attached to the sensor attachment piece 103b.

As shown in FIGS. 4 and 5, the lower guide member 103 has a baffle plate 103c in a substantially disk shape. The baffle plate 103c is a member configured to suppress bubbles from entering a hollow portion (an internal space of the upward concave shape in the vertical section) of the water level detecting float 101. The baffle plate 103c according to the present embodiment is provided integrally with the lower guide member 103.

The baffle plate is not limited to the above configuration, and a separate baffle plate in a substantially disk shape can be affixed to the upper surface or the lower surface of the lower guide member 103. The upper guide member 102 in the shape shown in FIG. 4 can be used as the lower guide member 103 in this case.

The float rod 104 is a bar-shaped member that shifts upward or downward in cooperation with the water level detecting float 101. The upper end of the float rod 104 is coupled to the water level detecting float 101. As shown in FIG. 5, the lower end of the float rod 104 is coupled to a refill water stopper 124 (to be described later) serving as a valve element.

The salt water valve pipe 110 is a cylindrical member that allows salt water W3 supplied from the salt water tank 7 to outside and makeup water (raw water W1) supplied from outside to the salt water tank 7 to flow therethrough. As shown in FIGS. 3 and 4, the upper end of the salt water valve pipe 110 penetrates the cover 91 of the salt water well 9 and is connected to a joint 96. The joint 96 is a part connecting the salt water valve pipe 110 and a first end of the salt water-makeup water line L3 connected to the salt water supply unit 3. Another joint, a connecting part, or the like can be provided between the joint 96 and the first end of the salt water-makeup water line L3. As shown in FIG. 6, the lower end of the salt water valve pipe 110 is connected to a second hole 129b of a lower air check housing 129 (to be described later).

As shown in FIG. 5, the air check housing portion 120 includes a salt water valve filter 121, the upper air check housing 122 serving as a valve box, a square ring 123, and the refill water stopper 124 serving as a valve element. As shown in FIG. 4, the air check housing portion 120 further includes a ball holder 125, a float ball 126, an O-ring 127, and a square ring 128. As shown in FIG. 6, the air check housing portion 120 also includes the lower air check housing 129, a metal ball 130, and a plug 131.

The salt water valve filter 121 removes dirt and the like contained in salt water W3 supplied from the salt water tank 7 to the passage switching valve unit 6. Such dirt and the like to be removed are mainly originated from salt ST. As shown in FIGS. 4 and 5, the salt water valve filter 121 has a guide hole 121a. The float rod 104 penetrates the guide hole 121a.

The upper air check housing 122 as well as the lower air check housing 129 (to be described later) hold the salt water valve filter 121. The upper air check housing 122 is provided at the top with a valve hole 122a. The valve hole 122a is an opening that allows salt water W3 and makeup water to flow therethrough. The salt water valve filter 121 is attached to the top of the upper air check housing 122. The upper air check housing 122 is coupled to the lower air check housing 129 (to be described later).

The square ring 123 is a part (valve seat) attached to the valve hole 122a of the upper air check housing 122.

The refill water stopper 124 is a part (valve element) configured to open and close the valve hole 122a of the upper air check housing 122. The refill water stopper 124 is coupled to the lower end of the float rod 104. The upper end of the float rod 104 is coupled to the water level detecting float 101. The refill water stopper 124 thus shifts in the axial direction of the float rod 104 along with the water level detecting float 101. Operation of the refill water stopper 124 will be described later.

The ball holder 125 is a part configured to accommodate the float ball 126. The ball holder 125 holds the float ball 126 so as to be shiftable upward and downward. Salt water W3 and makeup water can flow in a gap between the upper air check housing 122 and the ball holder 125 in a state where the float ball 126 is pushed up to the upper portion of the ball holder 125.

The float ball 126 is a spherical part held by the ball holder 125. The float ball 126 opens or closes a first hole 129a (to be described later) of the lower air check housing 129 in accordance with a water level of the ball holder 125. The float ball 126 is made of a material of specific gravity lower than that of makeup water (raw water W1). The float ball 126 is thus buoyant on makeup water and salt water W3. The float ball 126 is preferably made to be hollow for adjustment of specific gravity so as to reliably float or sink in accordance with a water level.

The O-ring 127 is a member airtightly sealing a gap between the upper air check housing 122 and the lower air check housing 129.

The square ring 128 is a member located in the first hole 129a of the lower air check housing 129. The square ring 128 has an inner diameter larger than the diameter of the first hole 129a and serves as a valve seat of the float ball 126.

The lower air check housing 129 is a member located below the upper air check housing 122. As shown in FIG. 6, the lower air check housing 129 has the first hole 129a, the second hole 129b, and a third hole 129c.

The first hole 129a is an opening that allows salt water W3 and makeup water (raw water W1) to flow therethrough. The second hole 129b is an opening connected with the lower end of the salt water valve pipe 110. The third hole 129c is an opening that accommodates the metal ball 130. The plug 131 is a member closing the third hole 129c. A water flow hole 132 is provided behind the third hole 129c (see FIG. 7). In a state where the metal ball 130 is in contact with the opening of the water flow hole 132, a slight gap is formed between the metal ball 130 and the water flow hole 132.

As shown in FIG. 4, the upper air check housing 122 and the lower air check housing 129 are coupled to each other by screws S3 in a state where the ball holder 125, the float ball 126, the O-ring 127, and the square ring 128 are accommodated therein.

A function of the air check housing portion 120 will be described below with reference to FIG. 7. FIG. 7 shows the air check housing portion 120 in a simplified manner for easier description.

In the regenerating process, the controller 4 switches the passages of the passage switching valve unit 6 so as to allow salt water W3 to flow from the salt water well 9 toward the passage switching valve unit 6. When the interior of the passage switching valve unit 6 is switched to the passage for the regenerating process, negative pressure is generated in the passage switching valve unit 6. Negative pressure is generated also in the salt water-makeup water line L3, the salt water valve pipe 110, and the air check housing portion 120. As shown in FIG. 7, this negative pressure causes the refill water stopper 124 to descend, so that the valve hole 122a of the upper air check housing 122 is opened. When the valve hole 122a is opened, salt water W3 reserved in the salt water tank 7 is sucked into the air check housing portion 120. The float ball 126 rises in the ball holder 125, and the first hole 129a of the lower air check housing 129 is thus opened. The metal ball 130 shifts toward the plug 131 (to the left in the figure) along with the flow of salt water W3. Sucked salt water W3 flows in the air check housing portion 120 and is supplied to the passage switching valve unit 6 through the salt water valve pipe 110 and the salt water-makeup water line L3. Salt water W3 supplied to the passage switching valve unit 6 is imported to the pressure tank 5 (see FIG. 1) and regenerates the ion exchange resin bed (not shown).

As the regenerating process proceeds, the water level of salt water W3 reserved in the salt water tank 7 generally descends. When there is substantially no salt water W3 in the air check housing portion 120, the float ball 126 descends to close the first hole 129a. Supply of salt water W3 from the salt water tank 7 to the passage switching valve unit 6 is then stopped. When the float ball 126 closes the first hole 129a, air is suppressed from being sucked. The refill water stopper 124 remains descended in the state where there is substantially no salt water W3. The valve hole 122a of the upper air check housing 122 is thus kept open.

The water refilling process is executed subsequently. In the water refilling process, the controller 4 switches the passages of the passage switching valve unit 6 so as to allow makeup water (raw water W1) to flow from the passage switching valve unit 6 toward the salt water well 9. When makeup water is supplied from the passage switching valve unit 6 toward the salt water well 9, the float ball 126 is pushed up by the supplied makeup water in the air check housing portion 120 and the first hole 129a is opened. Makeup water thus flows into the salt water tank 7 through the valve hole 122a of the upper air check housing 122 and is reserved in the salt water reservoir 72. The metal ball 130 shifts toward the water flow hole 132 (to the right in the figure) along with the flow of makeup water and comes into contact with the opening of the water flow hole 132 to restrict a flow rate of makeup water. Even when an excessive amount of makeup water flows into the air check housing portion 120 during water refilling, the refill water stopper 124 is thus prevented from being closed by water pressure.

The water level of salt water W3 in the salt water well 9 then ascends gradually as makeup water is reserved in the salt water reservoir 72. When the water level of salt water W3 ascends, the water level detecting float 101 also ascends. The water level detecting float 101 is coupled to the refill water stopper 124 by way of the float rod 104. When the water level of salt water W3 ascends to the prescribed water level WL and the water level detecting float 101 reaches the maximum rising position, the valve hole 122a of the upper air check housing 122 is closed by the refill water stopper 124. This stops the flow of makeup water into the salt water tank 7.

As described above, the salt water valve device 10 has the function of importing makeup water from outside to the salt water tank 7 in the water refilling process and the function of supplying salt water W3 reserved in the salt water tank 7 to outside in the regenerating process.

The concentration detector 11 will be described next.

Figure 8:
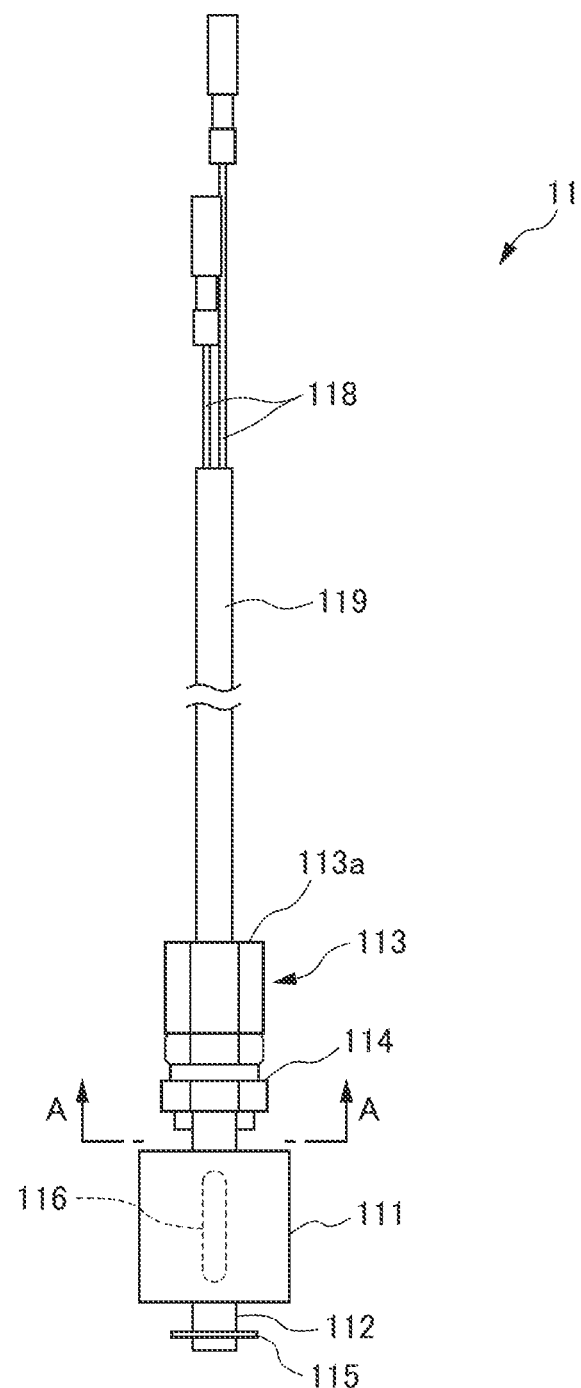
FIG. 8 is a side view of the concentration detector 11.
Figure 9:
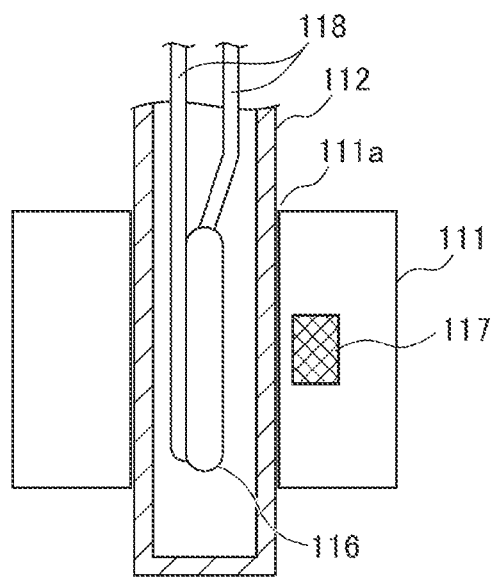
FIG. 9 is a schematic sectional view showing the internal configuration of a concentration detecting float 111.
Figure 10:
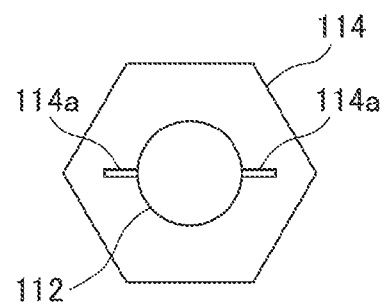
FIG. 10 is a schematic sectional view taken along line A-A indicated in FIG. 8.
Figure 11:
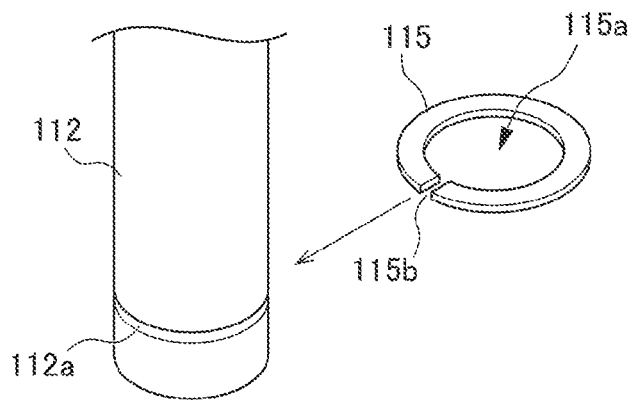
FIG. 11 is a perspective view showing an attachment structure of a lower stopper 115.

FIG. 8 is a side view of the concentration detector 11. FIG. 9 is a schematic sectional view showing the internal configuration of the concentration detecting float. FIG. 10 is a schematic sectional view taken along line A-A indicated in FIG. 8. FIG. 11 is a perspective view showing an attachment structure of a lower stopper. FIG. 11 does not include the concentration detecting float 111.

As shown in FIG. 8, the concentration detector 11 includes the concentration detecting float 111, a stem 112, a sensor attachment portion 113, an upper stopper 114, and a lower stopper 115. As shown in FIGS. 8 and 9, the concentration detector 11 further includes a float position detecting switch 116, a magnet 117 (see FIG. 9), sensor cables 118, and the sensor cable protective tube 119.

The concentration detecting float 111 is a member configured to detect a concentration of salt water W3 reserved in the salt water well 9. The concentration detecting float 111 has a substantially cylindrical shape. As shown in FIG. 9, the concentration detecting float 111 has a through hole 111a. The through hole 111a is a columnar opening provided along the central axis of the concentration detecting float 111. The stem 112 penetrates the through hole 111a. As shown in FIG. 9, the concentration detecting float 111 has the magnet 117 that is buried in contact with the through hole 111a.

The concentration detecting float 111 according to the present embodiment is a member having specific gravity of about 1.1. The specific gravity of 1.1 corresponds to the specific gravity of salt water of about 13 wt %. In a case where salt water W3 reserved in the salt water well 9 has a concentration higher than 13 wt %, the concentration detecting float 111 ascends along the stem 112. In another case where salt water W3 has a concentration lower than 13 wt %, the concentration detecting float 111 descends along the stem 112.

Adjustment of specific gravity of the concentration detecting float 111 can be achieved in various manners. Specific gravity can be adjusted in a case where the float is solid and is made of a synthetic resin material having specific gravity equivalent to specific gravity to be preferably detected. Specific gravity can be adjusted in another case where the float is hollow, is made of a synthetic resin material having specific gravity lower than the specific gravity to be preferably detected, and accommodates a weight (in a solid state or a liquid state) of required specific gravity.

Assume that a preset concentration of salt water W3 is 13 wt %. In a case where salt water W3 has a concentration higher than 13 wt %, the concentration detecting float 111 ascends and the float position detecting switch 116 transmits a first detection signal (to be described later) to the controller 4. In another case where salt water W3 has a concentration lower than 13 wt %, the concentration detecting float 111 descends and the float position detecting switch 116 transmits a second detection signal (to be described later) to the controller 4.

The stem 112 is a member configured to hold the concentration detecting float 111. The stem 112 holds the concentration detecting float 111 so as to be shiftable in the axial direction (in other words, shiftable upward and downward). The float position detecting switch 116 is incorporated in the stem 112. The upper end of the stem 112 is connected to the sensor attachment portion 113. The stem 112 is provided, at the lower end, with a groove 112a (see FIG. 11).

The float position detecting switch 116 is a reed switch configured to open or close internal reed pieces (not shown) in accordance with a magnetic field of the magnet 117 (see FIG. 9). The reed pieces are connected respectively with the sensor cables 118. The controller 4 supplies electric current of preset potential (set potential) to the float position detecting switch 116 through the sensor cables 118.

When the concentration of salt water W3 becomes not less than the preset concentration (13 wt %), the concentration detecting float 111 ascends and the magnet 117 approaches the float position detecting switch 116. The magnetic field of the magnet 117 causes the internal reed pieces to come into contact with each other (conducted), and the float position detecting switch 116 transmits the first detection signal (set potential) to the controller 4. More specifically, in a case where the concentration detecting float 111 reaches a preset position (a position of the concentration detecting float 111 stopped at the concentration of 13 wt %), the float position detecting switch 116 outputs the first detection signal.

In another case where the concentration of salt water W3 becomes less than the preset concentration (13 wt %), the concentration detecting float 111 descends and the magnet 117 is separated from the float position detecting switch 116. The magnetic field of the magnet 117 then does not cause the internal reed pieces to come into contact with each other (not conducted), and the float position detecting switch 116 transmits the second detection signal (zero potential) to the controller 4. In other words, in a case where the concentration detecting float 111 is distant from the preset position (the position of the concentration detecting float 111 stopped at the concentration of 13 wt %), the float position detecting switch 116 outputs the second detection signal.

The upper stopper 114 and the lower stopper 115 (see FIG. 8) are members configured to regulate a shift range of the concentration detecting float 111 in the vertical direction (the axial direction of the stem 112). In other words, the concentration detecting float 111 is shiftable between the upper stopper 114 and the lower stopper 115 in the axial direction of the stem 112.

The upper stopper 114 is a member located above the stem 112. As shown in FIG. 10, the upper stopper 114 is a flange-like part in a hexagonal shape. The upper stopper 114 has two projections 114a. The projections 114a thus provided prevent the concentration detecting float 111 shifted upward from adhering to the lower surface of the upper stopper 114 and being dried to firmly adhere thereto.

The lower stopper 115 is a member (snap ring) located below the stem 112. As shown in FIG. 11, the lower stopper 115 is a ring-shaped plate provided at the center with a circular opening 115a. The lower stopper 115 has a cutout 115b. The lower stopper 115 warped by opening the cutout 115b can be fitted into the groove 112a of the stem 112. The lower stopper 115 warped by opening the cutout 115b can be also detached from the groove 112a of the stem 112.

The sensor attachment portion 113 (see FIG. 8) is a part configured to attach the concentration detector 11 to the salt water valve pipe 110. The sensor attachment portion 113 has a cap nut 113a and a screw portion 113b (see FIG. 4) fitted to the cap nut 113a. As shown in FIG. 4, when the screw portion 113b is inserted to a hole (not denoted by a reference sign) provided at the sensor attachment piece 103b of the lower guide member 103 and the cap nut 113a is fastened to the screw portion 113b, the concentration detector 11 can be attached to the lower guide member 103. When the concentration detector 11 is attached to the lower guide member 103, the stem 112 is located close to the float rod 104 that is positioned between the upper air check housing 122 and the water level detecting float 101 (see FIG. 3). The axial center of the stem 112 is positioned on a single circumference around the axial center of the float rod 104.

Positioning of the concentration detecting float 111 will be described below. As shown in FIG. 3, the concentration detecting float 111 is located such that the lower end of the concentration detecting float 111 is positioned in a range (indicated by reference sign B) from the lower end (H1) of the water level detecting float 101 shifted to the prescribed water level WL at the maximum rising position to the position therebelow by 150 mm.

The sensor cables 118 (see FIG. 8) are electric wires connected to the float position detecting switch 116. The sensor cable protective tube 119 is a member accommodating the sensor cables 118. The sensor cable protective tube 119 can be a nylon tube of 6 mm in outer diameter and 4.5 mm in inner diameter, for example. The sensor cables 118 accommodated in the sensor cable protective tube 119 can be improved in waterproof property as well as in insulation property. Accordingly, this configuration can suppress erroneous determination due to corrosion, poor contact, or the like of the sensor cables 118.

As shown in FIG. 3, the sensor cable protective tube 119 is attached to the side surface of the salt water valve pipe 110 by a fastener 105. The sensor cable protective tube 119 penetrates a hole (not shown) provided in the cover 91 and is led out of the salt water well 9.

Figure 12:
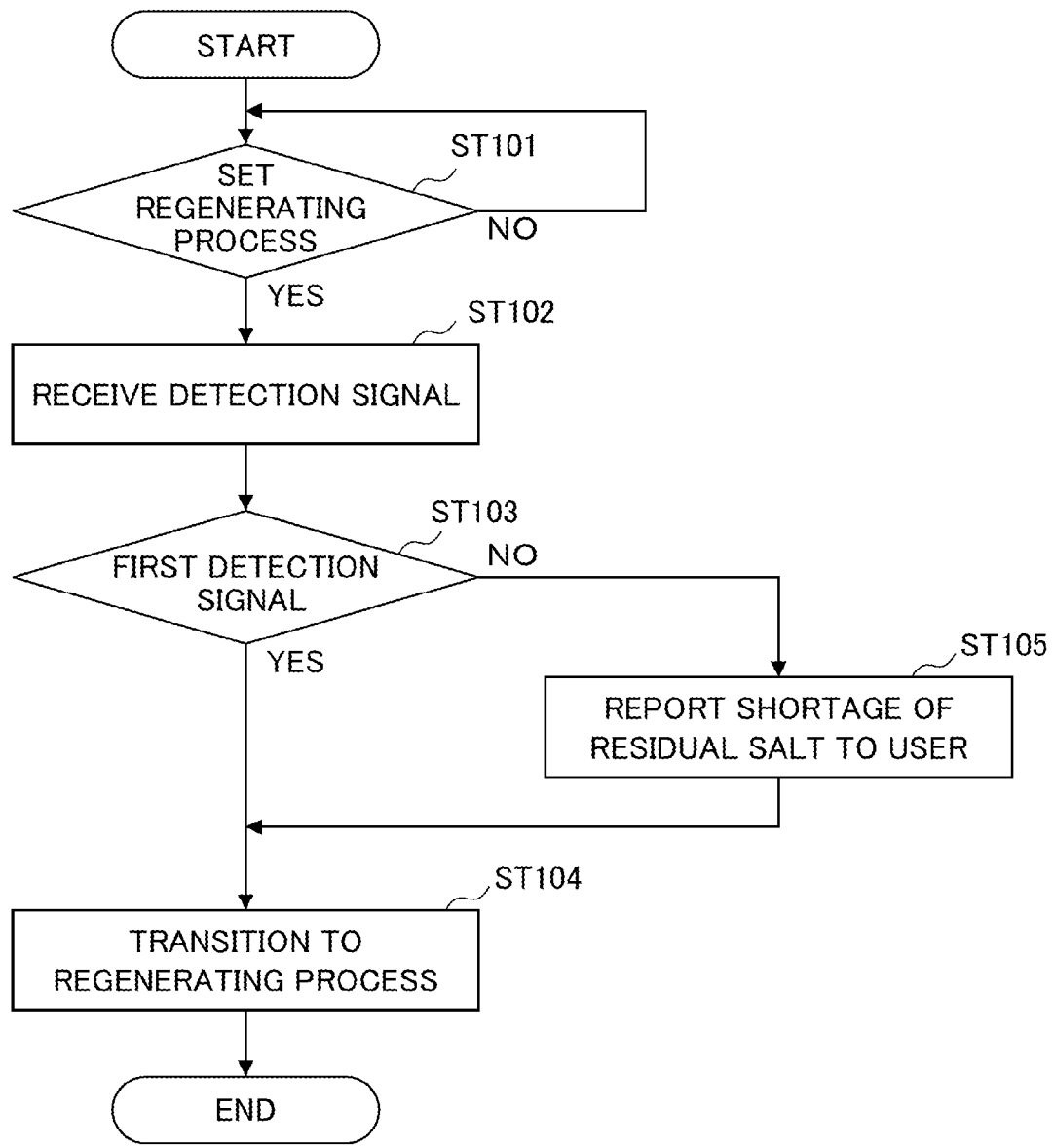
FIG. 12 is a flowchart of process steps for determination of a concentration of salt water W3 by a controller 4.

The process steps for determination of a concentration of salt water W3 by the controller 4 according to the present embodiment will be described next with reference to FIG. 12. FIG. 12 is a flowchart of the process steps for determination of a concentration of salt water W3 by the controller 4. The process steps indicated in the flowchart in FIG. 12 are repeated while the water softening apparatus 1 is in operation.

In step ST101 indicated in FIG. 12, the controller 4 determines whether or not a set operation process is the regenerating process. If the controller 4 determines that the set operation process is the regenerating process (YES) in step ST101, the flow proceeds to step ST102. If the controller 4 determines that the set operation process is not the regenerating process (NO) in step ST101, the flow returns to step ST101.

In step ST102 (YES in step ST101), the controller 4 receives a detection signal transmitted from the concentration detector 11 (the float position detecting switch 116).

In step ST103, the controller 4 determines whether or not the detection signal received in step ST102 is the first detection signal. If the controller 4 determines that the received detection signal is the first detection signal (YES) in step ST103, the flow proceeds to step ST104. If the controller 4 determines that the received detection signal is not the first detection signal (NO) in step ST103, in other words, if the controller 4 determines that the received detection signal is the second detection signal, the flow proceeds to step ST105.

In step ST104 (YES in step ST103), the controller 4 transitions to the regenerating process. The flow in this flowchart then ends (the operation transitions to the subsequent displacement process).

In step ST105 (NO in step ST103), the controller 4 reports shortage of residual salt to a user by lighting the alarm lamp that is provided at the operation panel (not shown) of the water softening apparatus 1.

The controller 4 permits transition to the regenerating process even when the controller 4 reports shortage of residual salt to a user in step ST105. This is because ability of the ion exchange resin bed can be recovered to some extent and soft water will be collected even when the concentration of salt water is decreased. However, hardness leakage (in other words, deterioration in collected water amount) in an early stage is inevitable. When the controller 4 reports shortage of residual salt, the controller 4 is desired to report poor regeneration after the end of regeneration.

The salt water supply unit 3 according to the first embodiment described above exerts the following effects, for example.

(1) The salt water well 9 in the salt water supply unit 3 is provided, in the side surface of the main body 90, with the upper communication port 92 and the lower communication ports 93 (see FIG. 2). When makeup water is supplied from outside to the salt water tank 7 in the salt water supply unit 3 and salt ST dissolves, salt water W3 of high specific gravity in the upper region of the salt water reservoir 72 pushes down salt water W3 of low specific gravity in the lower region of the salt water reservoir 72. A downward flow of salt water W3 is thus generated from the upper region toward the lower region of the salt water reservoir 72. Salt water W3 of low specific gravity pushed out by the downward flow flows into the salt water well 9 through the lower communication ports 93. Salt water W3 having flowed into the salt water well 9 pushes up salt water W3 in the salt water well 9 from the lower region toward the upper region. An upward flow of salt water W3 is thus generated in the salt water well 9. Salt water W3 pushed out of the upper region of the salt water well 9 by the upward flow flows out of the salt water well 9 through the upper communication port 92. Salt water W3 of low specific gravity repeatedly comes into contact with salt ST to promote dissolution of salt.

In this manner, when makeup water is supplied from outside to the salt water tank 7, a difference in specific gravity of salt water W3 generates circulating convection (a downward flow and a upward flow) of salt water W3 between the interior of the salt water well 9 and the salt water tank 7. The concentration of salt water W3 reserved in the salt water well 9 and the concentration of salt water W3 reserved in the salt water tank 7 can be quickly uniformized in the salt water supply unit 3 by the effect of the circulating convection generated inside and outside the salt water well 9 after supply of makeup water.

(2) The concentration of salt water W3 reserved in the salt water well 9 and the concentration of salt water W3 reserved in the salt water tank 7 can be quickly uniformized in the salt water supply unit 3. There is thus less likely to be caused a difference in water level due to a difference in specific gravity between the interior and the exterior of the salt water well 9. More specifically, the water level detecting float 101 located in the salt water well 9 does not reach the prescribed water level WL before the water level of salt water W3 reserved in the salt water tank 7 ascends to the prescribed water level WL. The amount of makeup water reserved in the salt water tank 7 can be thus regarded as the preset water amount in the salt water supply unit 3. The salt water supply unit 3 can thus properly generate a required amount of salt water W3 to be consumed outside.

(3) The concentration of salt water W3 reserved in the salt water well 9 and the concentration of salt water W3 reserved in the salt water tank 7 can be quickly uniformized in the salt water supply unit 3. The concentration detector 11 located in the salt water well 9 can thus accurately detect a concentration of salt water. The water softening apparatus 1 including the salt water supply unit 3 can accordingly report shortage of residual salt to a user at appropriate timing.

(4) In the salt water supply unit 3, the stem 112 holding the concentration detecting float 111 so as to be shiftable upward and downward is located close to the float rod 104 that is positioned between the upper air check housing 122 and the water level detecting float 101 (see FIG. 3). When makeup water (raw water W1) is supplied from outside to the salt water tank 7 in the water refilling process, makeup water flowed through the valve hole 122a of the upper air check housing 122 flows from the valve hole 122a toward the water level detecting float 101 in the salt water well 9. Crystalline salt and the like adhering to the concentration detecting float 111 can be washed away by makeup water. The salt water supply unit 3 can thus prevent firm adhesion of the concentration detecting float 111 and avoid erroneous operation of the concentration detector 11.

(5) In the salt water supply unit 3, the water level detecting float 101 is located such that, when the water level detecting float 101 is shifted to a prescribed water level WL at the maximum rising position, the lower end of the water level detecting float 101 is positioned in the range from the upper surface of the salt water plate 8 to the position thereabove by 20 to 100 mm (see FIG. 3). A prescribed amount out of salt ST placed on the salt water plate 8 thus sinks at the end of the water refilling process. The salt water supply unit 3 can allow the prescribed amount of salt ST to be constantly in contact with makeup water. Accordingly, time required for generation of salt water W3 of the saturated concentration can be kept substantially constant.

(6) In the salt water supply unit 3, the concentration detecting float 111 in the concentration detector 11 is located such that the lower end of the concentration detecting float 111 is positioned in the range from the lower end of the water level detecting float 101 shifted to the prescribed water level WL at the maximum rising position to the position therebelow by 150 mm (see FIG. 3). When salt ST dissolves, salt water W3 of high specific gravity generated above the salt water plate 8 sinks toward the lower region in the salt water reservoir 72. Salt water W3 of relatively low specific gravity is thus likely to accumulate around the salt water plate 8. Salt water around the concentration detector 11 is likely to be equalized in concentration to salt water around the salt water plate 8 by convection and diffusion through the upper communication port 92. The concentration detector 11 can thus detect, in the salt water well 9, a concentration of salt water around the salt water plate 8 where salt water W3 of relatively low specific gravity accumulates. The salt water supply unit 3 can thus determine a concentration of salt water in a reserve region where specific gravity of salt water is likely to be low. Shortage of residual salt can be accordingly reported in an early stage to minimize a risk of hardness leakage in the water softening apparatus 1.

(7) In the salt water supply unit 3, the water level detecting float 101 has the cylindrical shape and the vertical section has the upward concave shape (see FIG. 5). The lower guide member 103 located below the water level detecting float 101 has the baffle plate 103c in the substantially disk shape (see FIG. 5). Bubbles in makeup water supplied from outside can be thus suppressed from entering the water level detecting float 101 in the water refilling process. This configuration can prevent the water level detecting float 101 from reaching the maximum rising position too early due to buoyancy of bubbles having entered the water level detecting float 101, which defectively leads to shortage of the amount of reserved makeup water. The salt water supply unit 3 can thus eliminate erroneous operation of the water level detecting float 101 and always reliably generate a required amount of salt water W3.

(8) In the salt water supply unit 3, the sensor cables 118 of the concentration detector 11 are accommodated in the sensor cable protective tube 119 (see FIG. 8). The sensor cables 118 can be thus improved in waterproof property as well as in insulation property. This configuration can avoid erroneous determination due to corrosion, poor contact, or the like of the sensor cables 118.

(9) The controller 4 in the water softening apparatus 1 determines a concentration of salt water W3 immediately before the regenerating process (see FIG. 12). The controller 4 reports shortage of residual salt to a user if the concentration of salt water reserved in the salt water tank 7 is less than a preset concentration. Typically, if the regenerating process is executed with insufficient residual salt, regeneration may be poor. The water softening apparatus 1 encourages a user to supply salt when the concentration of salt water is less than the preset concentration and can thus suppress poor regeneration.

(10) In the salt water supply unit 3, the upper stopper 114 of the concentration detector 11 has the two projections 114a (see FIG. 10). The upper surface of the concentration detecting float 111 shifted upward is thus less likely to adhere to the lower surface of the upper stopper 114. When the water level of the salt water tank 7 descends in the regenerating process, the upper surface of the concentration detecting float 111 and the lower surface of the upper stopper 114 can be prevented from being kept adhering to each other and dried to firmly adhere. The concentration detector 11 can thus detect a concentration of salt water more accurately.

(11) In the salt water supply unit 3, the stem 112 of the concentration detector 11 is provided, at the lower end, with the groove 112a. The lower stopper 115 is the ring-shaped plate provided with the opening 115a and the cutout 115b (see FIG. 11). The lower stopper 115 warped by opening the cutout 115b can be thus fitted into the groove 112a of the stem 112. The lower stopper 115 warped by opening the cutout 115b can be also detached from the groove 112a of the stem 112. The concentration detecting float 111 can be thus easily replaced in the concentration detector 11.

Second Embodiment

A water softening apparatus 1A according to the second embodiment is different from the water softening apparatus according to the first embodiment in that a salt water supply unit 3A includes neither the concentration detector 11 nor the controller 4. The other configurations are the same as those of the water softening apparatus 1 according to the first embodiment, and are not described repeatedly. FIG. 1 is cited as a figure showing the entire configuration of the water softening apparatus 1A according to the second embodiment.

The water softening apparatus 1A according to the second embodiment is applicable to a model configured to execute the regenerating process up to twice a day. The salt water well 9 in the salt water supply unit 3 is provided with the upper communication port 92 and the lower communication ports 93 to cause circulating convection of salt water W3 due to a difference in specific gravity. Salt water W3 of the saturated concentration is thus generated in about six to twelve hours. If the regenerating process is executed up to twice a day, more particularly, at intervals of at least about twelve hours, salt water W3 of a concentration approximate to the saturated concentration can be supplied constantly and the regenerating process can be executed with no determination of a concentration of salt water W3.

The salt water supply unit 3A according to the second embodiment described above exerts the effects (1), (2), (5), and (7) of the salt water supply unit 3 according to the first embodiment.

The salt water supply unit and the water softening apparatus according to the preferred embodiments of the present invention have been described above. The salt water supply unit according to the present invention can be appropriately modified without being limited to the configurations according to the first and second embodiments.

The first embodiment exemplifies the case where the single concentration detector 11 is included. The present invention is not limited to this case and a plurality of concentration detectors 11 can be included. In this case, the stem 112 incorporating the float position detecting switch 116 is located such that the axial center is positioned on a single circumference around the axial center of the float rod 104 in each of the concentration detectors 11. In such a configuration, the plurality of concentration detectors 11 each configured to detect different specific gravity can be located at equal height around the float rod 104. Concentrations of salt water W3 in the regions of the concentration detectors 11 can be determined stepwise in this configuration. Stepwise determination of concentrations of salt water W3 enables stepwise report of residual salt to a user. The user can thus prepare and supply salt to be refilled beforehand.

The first (second) embodiment exemplifies the case where the single upper communication port 92 is provided in the side surface of the salt water well 9. The present invention is not limited to this case, and a plurality of upper communication ports 92 can be provided in the side surface of the salt water well 9. The first (second) embodiment exemplifies the case where the eight lower communication ports 93 are provided in the side surface of the salt water well 9. The present invention is not limited to this case, and nine or more lower communication ports 93 can be provided in the side surface of the salt water well 9 or one to seven lower communication ports 93 can be provided. The positions of the lower communication ports 93 can be appropriately set in accordance with the shape, size, and the like of the salt water well 9.

The first embodiment exemplifies the case where the float position detecting switch 116 of the concentration detector 11 is the reed switch configured to open or close the internal reed pieces in accordance with the magnetic field of the magnet 117. The present invention is not limited to this case, and the float position detecting switch 116 can be a switch configured to mechanically detect a position of the concentration detecting float 111. Still alternatively, the float position detecting switch 116 can be a sensor configured to optically detect a position of the concentration detecting float 111.

The present invention can be embodied in other various forms without departing from the spirit or the leading features thereof. The above embodiments or examples are thus merely illustration on any points and should not be interpreted limitedly. The scope of the present invention is recited by the claims and is never restricted by the description. Any modification or alteration belonging to the equivalent range of the claims is made within the scope of the present invention.

EXPLANATION OF REFERENCE NUMERALS 1, 1A: Water softening apparatus
2: Ion exchange unit
3: Salt water supply unit
4: Controller
5: Pressure tank
6: Passage switching valve unit
7: Salt water tank
8: Salt water plate
9: Salt water well
10: Salt water valve device
11: Concentration detector
71: Salt container
72: Salt water reservoir
92: Upper communication port
93: Lower communication port
100: Float portion
101: Water level detecting float
102: Upper guide member
103: Lower guide member
103c: Baffle plate
104: Float rod
110: Salt water valve pipe
111: Concentration detecting float
112: Stem
116: Float position detecting switch
120: Air check housing portion
122: Upper air check housing (Valve box)
124: Water refill stopper (Valve element)

The invention claimed is:
1. A salt water supply unit comprising:
a salt water tank having a salt container configured to contain salt and a salt water reservoir configured to reserve salt water that is generated from the salt contained in the salt container and makeup water imported from outside;
a salt water plate provided in the salt water tank and allowing the salt contained in the salt container to be placed thereon;
a salt water valve device having functions of controlling a flow of the makeup water from outside and a flow of the salt water to outside and blocking a flow of the makeup water when a water level of the salt water tank reaches a prescribed water level set in advance;
at least one concentration detector having a concentration detecting float configured to float or sink in accordance with a concentration of the salt water in the salt water tank and to output a detection signal in accordance with a position of the concentration detecting float; and
a salt water well provided in the salt water tank and accommodating the salt water valve device and the concentration detector; wherein an upper communication port connected fluidly to the salt water reservoir is provided at a first region of a side surface of the salt water well, the first region being positioned between a water surface of the prescribed water level and an upper surface of the salt water plate, and a lower communication port connected fluidly to the salt water reservoir is provided at a second region of the side surface, the second region being positioned between a lower surface of the salt water plate and a bottom surface of the salt water tank, the salt water valve device includes a valve box having a valve hole that allows the makeup water or the salt water to flow therethrough, a float rod having a bar shape and penetrating the valve hole, a valve element coupled to a first end of the float rod and configured to open and close the valve hole, and a water level detecting float coupled to a second end of the float rod, the concentration detector includes a float position detecting switch incorporated in a stem which is configured to support the concentration detecting float movably upward and downward, the float position detecting switch being configured to output a first detection signal when the salt water has a concentration not less than a preset concentration and the concentration detecting float reaches a preset position, and a second detection signal different from the first detection signal when the salt water has a concentration less than the preset concentration and the concentration detecting float is distant from the preset position, the stem which is independent structurally of the float rod is configured to be spaced away from and substantially in parallel with the float rod that is positioned between the valve box and the water level detecting float, wherein the water level detecting float has a cylindrical shape and a vertical section in an upward concave shape, and the water level detecting float has an upper guide member above the water level detecting float and a lower guide member below the water level detecting float in ark axial direction of the float rod, wherein the lower guide member has a baffle plate suppressing bubbles from entering the water level detecting float, the baffle plate being formed integrally with the lower guide member, wherein the stem is fixed to the lower guide member, and wherein an area of the baffle plate is configured to be larger than an area of an aperture of the water level detecting float.

2. The salt water supply unit according to claim 1, wherein a lower end of the water level detecting float is positioned in a range from the upper surface of the salt water plate 20 to 100 mm above the upper surface thereof, when the water level detecting float is at the prescribed water level as a maximum rising position, and a lower end of the concentration detecting float is positioned 150 mm maximum below the lower end of the water level detecting float, when the water level detecting float is at the maximum rising position.

3. A water softening apparatus comprising:

a pressure tank filled with an ion exchange resin bed;

a passage switching valve unit connected to the pressure tank and configured to switch internal passages;

the salt water supply unit according to claim 1, the salt water supply unit being connected to the passage switching valve unit and configured to supply the pressure tank with salt water serving as a regenerant through the passage switching valve unit when the passage switching valve unit switches the passages to allow a process of regenerating the ion exchange resin bed to be executed; and a controller configured to switch the passages at the passage switching valve unit and to determine a concentration of salt water in the salt water supply unit; wherein the controller determines the concentration of the salt water in the salt water supply unit immediately before the regenerating process and reports shortage of residual salt when the controller determines that the concentration of the salt water in the salt water supply unit is less than a preset concentration.

* * * * *

UNITED STATES PATENT AND TRADEMARK OFFICE
CERTIFICATE OF CORRECTION

| | |
|---|---|
| PATENT NO. | : 9,533,902 B2 |
| APPLICATION NO. | : 14/421331 |
| DATED | : January 3, 2017 |
| INVENTOR(S) | : Shinya Yamaoka |

Page 1 of 1

It is certified that error appears in the above-identified patent and that said Letters Patent is hereby corrected as shown below:

In the Claims

In Column 21, Line 39, change "float in ark axial direction of the float rod," to --float in an axial direction of the float rod,--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*